US012236922B2

(12) United States Patent
Neary

(10) Patent No.: US 12,236,922 B2
(45) Date of Patent: Feb. 25, 2025

(54) QUICK RELEASE HARMONICA HOLDER

(71) Applicant: Stuart Douglas Neary, New Minas (CA)

(72) Inventor: Stuart Douglas Neary, New Minas (CA)

( * ) Notice: Subject to any disclaimer, the term of this patent is extended or adjusted under 35 U.S.C. 154(b) by 297 days.

(21) Appl. No.: 16/923,453

(22) Filed: Jul. 8, 2020

(65) Prior Publication Data

US 2021/0020148 A1 Jan. 21, 2021

Related U.S. Application Data

(60) Provisional application No. 62/921,910, filed on Jul. 15, 2019.

(51) Int. Cl.
*G10G 5/00* (2006.01)
*G10D 7/14* (2020.01)

(52) U.S. Cl.
CPC ............... *G10G 5/005* (2013.01); *G10D 7/14* (2020.02)

(58) Field of Classification Search
CPC ............ G10G 5/005; G10G 5/00; G10D 7/14; G10D 7/00
See application file for complete search history.

(56) References Cited

U.S. PATENT DOCUMENTS

| | | | | |
|---|---|---|---|---|
| 9,430,995 B1 * | 8/2016 | Paresi | ...................... | G10D 7/14 |
| 2015/0090097 A1 * | 4/2015 | Kaynor | .................... | G10G 5/00 84/379 |

* cited by examiner

*Primary Examiner* — Kimberly R Lockett

(57) ABSTRACT

The invention relates to improvements to the harmonica holder, which allows the musician to play the harmonica and another instrument at the same time. The inventor's control arm and extender tubes allows the musician to adjust the position of the harmonica (in the horizontal and vertical plains). After adjustment, the control arm allows the musician to quickly raise the harmonica up to the adjustment position, which locks the harmonic in place and eliminates the need to re-set the harmonica each time it is used. To unlock the harmonica and drop it completely out of the way for singing or to remove the harmonica from the musician's head area, the musician would simply tap the end of the control arm up, to disengage it. The pull down loop (attached to the harmonica cross member) allows the musician to quickly change harmonicas from one key to another.

9 Claims, 11 Drawing Sheets

QUICK RELEASE HARMONICA HOLDER

BACKGROUND OF INVENTION

The field of endeavor to which the embodiments of the present invention relate to is the music industry, with the focus being on harmonica holders that are designed to be placed over a musician's head and be supported by their neck and chest area, FIG. 14 (prior art). Harmonica holders facilitate hands free use to play a harmonica, thus allowing a musician to use their hands to play another instrument, such as a guitar or piano, at the same time, while performing, practicing and/or recording. The technical field would be described as a "harmonica holder".

PRIOR ART

The invention would generally be referred to as a harmonica holder, although they have been referred to as a mouth organ holder, harp holder, harmonica adapter, harmonica rack and harmonica cradle. The following is a list of prior art patents, as obtained from the United States patent office, when the term "harmonica holder" was entered. The following list focuses on harmonica holders that relate to the present invention i.e. harmonica holders that are designed to be placed over the head of a musician and supported by the neck and chest area.

U.S. Pat. No. 411,374 Date: Sep. 17, 1889 Inventor: A. B. Clark

This is an example of a very early patent and how the inventor solved the problem of holding a harmonica in place. The patent shows a harmonica being supported by an over the shoulder brace and it utilized springs to hold a harmonica in place.

U.S. Pat. No. 753,713 Date: Mar. 1, 1904 Inventor: O. T. Knode

This inventor took a different approach to holding a harmonica in place, by using two arms, which would be pulled apart and then would press up against each end of a harmonica, when released.

U.S. Pat. No. 1,734,799 Date: Nov. 5, 1929 Inventor: L. A. Elkington

This inventor saw the problems of an over the shoulder brace and resolved it by designing an over the head configuration and a curved neck support. This design proved to be well received, as it was very simple.

U.S. Pat. No. 1,793,823 Date: Feb. 24, 1931 Inventor: A. E. Overton

This inventor felt there was a better way to secure a harmonica in place wherein, as a cross member was raised up, it would squeeze support members together and thus hold a harmonica in place, by putting pressure on both ends of a harmonica.

U.S. Pat. No. 3,172,328 Date: Mar. 9, 1965 Inventor: E. Haile

This inventor saw a need to simplify a harmonica holder and did so by having no unnecessary curves to the design and in doing so this design is still in production today.

U.S. Pat. No. 3,332,310 Date: Jul. 25, 1967 Inventor: F. A. Pochobradsky

This inventor saw a need to be able to play a large harmonica and to bend the neck support back for a better fit.

U.S. Pat. No. 4,739,686 Date: Apr. 26, 1988 Inventor: Michael Doll

This inventor saw a need to better hold a harmonica and thus made an adaptor to slide a harmonica into.

U.S. Pat. No. 5,619,001 Date: Apr. 8, 1997 Inventor: Mark Pasin

This inventor designed a harmonica holder to be able to adjust a harmonica in the horizontal and vertical plane and to keep a harmonica from moving out of position.

U.S. Pat. No. 9,029,673 Date: May 12, 2015 Inventor: Peter Kaynor

This inventor wanted to make it easier to mount a harmonica by using a magnetic cradle. Also a harmonica can be adjusted and locked into place.

U.S. Pat. No. 9,430,995 Date: Aug. 30, 2016 Inventor: Joseph D. Paresi

This inventor saw a need to be able to move a harmonica out of the way for singing, by the use of an automatic positioner footswitch, which would extend or retract a harmonica.

STATE OF TECHNOLOGY

The harmonica was invented in 1821 by Christian Buschmann and was designed to be a hand held instrument. However a need was seen to be able to play another instrument at the same time and thus harmonica holders were developed about 130 years ago. The first ones developed were supported by a musician's shoulder and chest area, and the first patent found of this type was by A. B. Clark in 1889. Although there are many different types of harmonica holders, the most popular are those that are designed to fit over the head of a musician and be supported by their neck and chest area. Over the years there have been many patents filed in an effort to improve them, in one way or another, however problems still exist and in this regards:

Many harmonica holders do not have good support for a harmonica, as the two support structures (one to hold a harmonica and the other for neck support) are only held in place by two wing nuts and as a result a harmonica can move out of position when being played.

With regards to singing, no effort has been made to quickly drop a harmonica out of the way and as a result a musician has to bend their head down to play it, which means their head would be facing the floor instead of the audience, not to mention the fact that it becomes very uncomfortable.

In order to remove a harmonica holder from a musician's head area, fasteners of one kind or another have to be loosened, in order to do so.

With regards to the horizontal position of a harmonica, relative to the musician's mouth area, most harmonic holders have to be adjusted each time they are put on, which is not conducive to consistent adjustment and takes time.

The "one size fits all" factor has been predominant for years, however a harmonica holder of this type cannot be adjusted in the vertical plane, relative to the musician's mouth area, to suit a musician's personal needs.

There is also the problem of changing a harmonica out for another key. In most cases a musician has to remove a harmonica holder from their head area and use both hands to remove a harmonica.

Also neck support frames are not adjustable and do not conform very well to the anatomy of the neck, as they are in most cases, a simple round rod and as a result undue pressure is exerted upon the neck area.

In the past there has been changes to the design of a harmonica holder or to off load the problem to a microphone stand (which would be very unstable), but there has been no fundamental changes necessary to addressed the core problems, which have existed for years. Also, of all the patents listed, without exception they all lack (in one way or another) the fundamental attributes necessary to address all the problems as stated above. Another factor that must be considered is the commercial aspect of marketing and in some cases, in an effort to improve a harmonica holder, it has been complicated to where the retail price is more than the average consumer would be willing to pay. Some harmonica holders have addressed some of the problems mentioned above but none have addressed all of the problems.

SUMMARY OF INVENTION

All drawings and pictures herein, use the same part numbers and names for the same part. Numbers throughout this entire document which follow the part name, refer to the numbers shown on FIG. 1 unless otherwise indicated, such as FIG. 5.

The invention relates to harmonica holders which are designed to be placed over the head of a musician, to allow a musician to play a harmonica and at the same time use their hands to play another instrument. The following defines operational problems associated with present day harmonica holder technology and how the embodiments of the present Invention are designed, not only to simplify said operations but to improve and resolve others, all of which are defined below, namely:

1) The problem of a harmonica coming loose when being played, has been resolved, wherein a control arm 21 will automatically lock a harmonica firmly into position, as a harmonica is raised up to play.

2) The problem of not being able to move a harmonica out of the way for singing, has been resolved, wherein a simple tap up on the end of the control arm 21 will drop a harmonica completely out of the way.

3) The problem of having to loosen fasteners, in order to remove a harmonica holder from a musician's head area, has been resolved, whereas again a simple tap up on the end of the control arm 21, will release a harmonica holder from its closed position FIG. 12 for playing a harmonica, to its open position FIG. 15 for removal.

4) The problem of having to adjust the horizontal position of a harmonica, relative to a musician's mouth area, each time it is put on, has also been resolved by the control arm 21, wherein it has a plurality of adjustment holes 10 and once adjusted it never has to be adjusted again unless desired.

5) The problem of a musician having to bend their head down to play a harmonica, whereupon they would be facing the floor instead of the audience, has been resolved by extender tube assembles FIG. 8, which can adjust a harmonica in the vertical plane, relative to a musician's mouth area, and as a result a musician would be facing the audience and this vertical position never has to be adjusted again, unless desired.

6) The problem of having to remove a harmonica holder from a musician's head area, in order to change a harmonica from one key to another, has been resolved by a pull down loop 7, which is attached to the underside of a harmonica cross member 6, whereupon a simply one finger pull down on the pull down loop 7, will release a harmonica without having to remove a harmonica holder from a musician's head area to do so.

7) The problem of having undue pressure exerted on a musician's neck area by a round neck support rod, has been resolved by the use of a flat curved neck support 14, with a rounded molding 13 attached to its underside, and the neck support 14 is adjustable to conform with the anatomy of a musician's neck area.

DETAILED DESCRIPTIONS OF INVENTION

Embodiments of the present invention will now be described in detail with reference to pictures and drawings, which are provided as illustrative examples. Notably, the figures and examples are not meant to limit the scope to a single embodiment, but other embodiments are possible by way of interchange of some or all of the described or illustrated elements. In the present specification, an embodiment showing or referring to a single component should not be considered limiting, rather the scope is intended to encompass other embodiments including but not limited to a plurality of the same component and vice-versa, unless explicitly stated otherwise herein. Further, the scope encompasses present and future known equivalents to the components referred to herein by the way of illustration.

Definition of a nylock nut or a nylock wingnut: both are self-tensioning nuts which have a nylon insert to prevent them from coming loose. These type of nuts are, among other things, used for pivotal connections, whereas they retain their set position.

Figure 1:
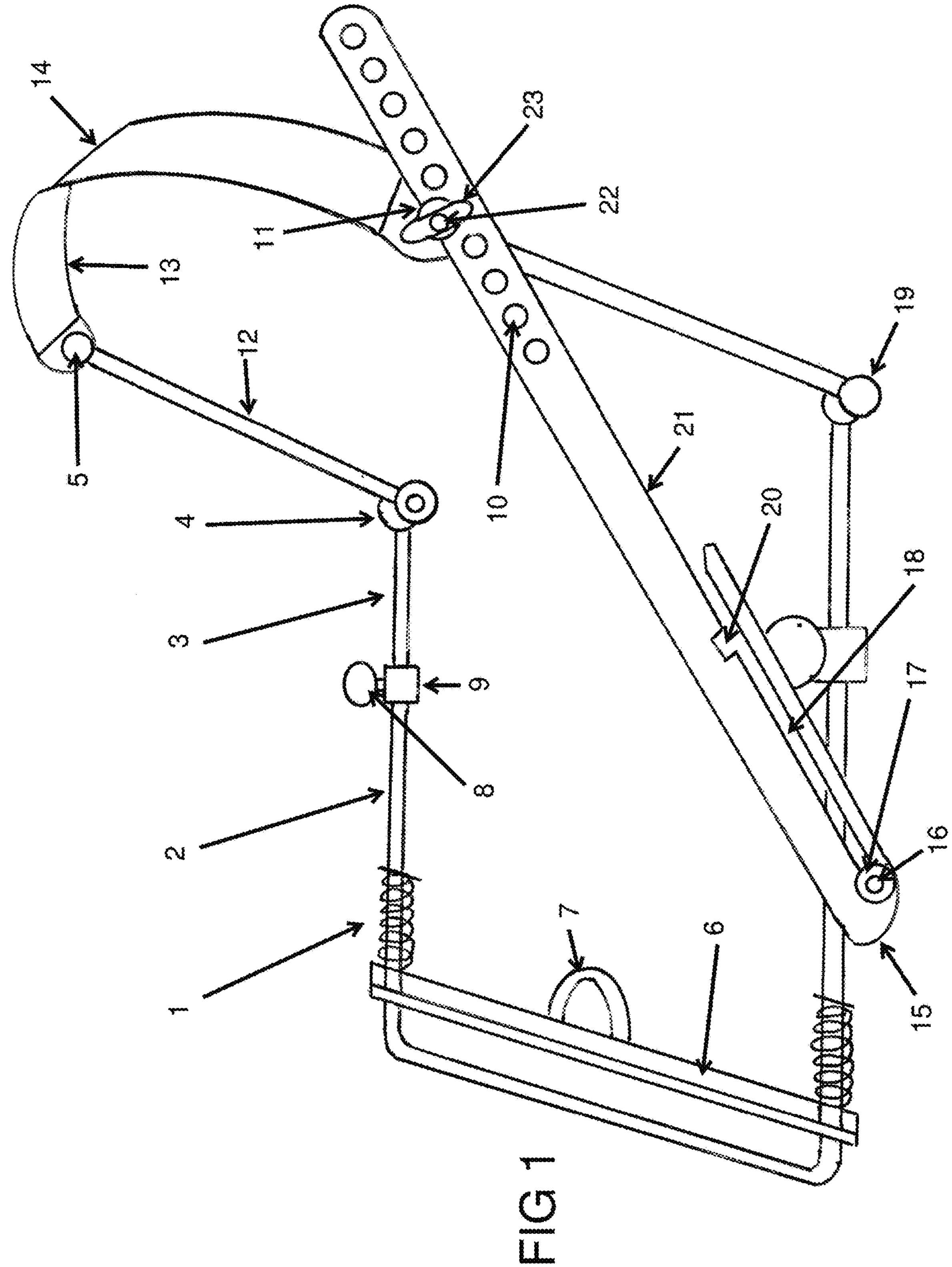
FIG. 1: Drawing showing part numbers related to the present invention, with the harmonica holder shown in the open position for singing or to remove a harmonica holder from a musician's head area.

Definition in reference to the right or left side of a harmonica holder: describes something located toward or in the direction of a person's right or left hand, when a harmonica holder is resting on a musician's neck and shoulder area, with a harmonica positioned in front of their head area. As an example the control arm 21 is considered to be on the left side of the harmonica holder, as shown in FIG. 1.

Figure 8:
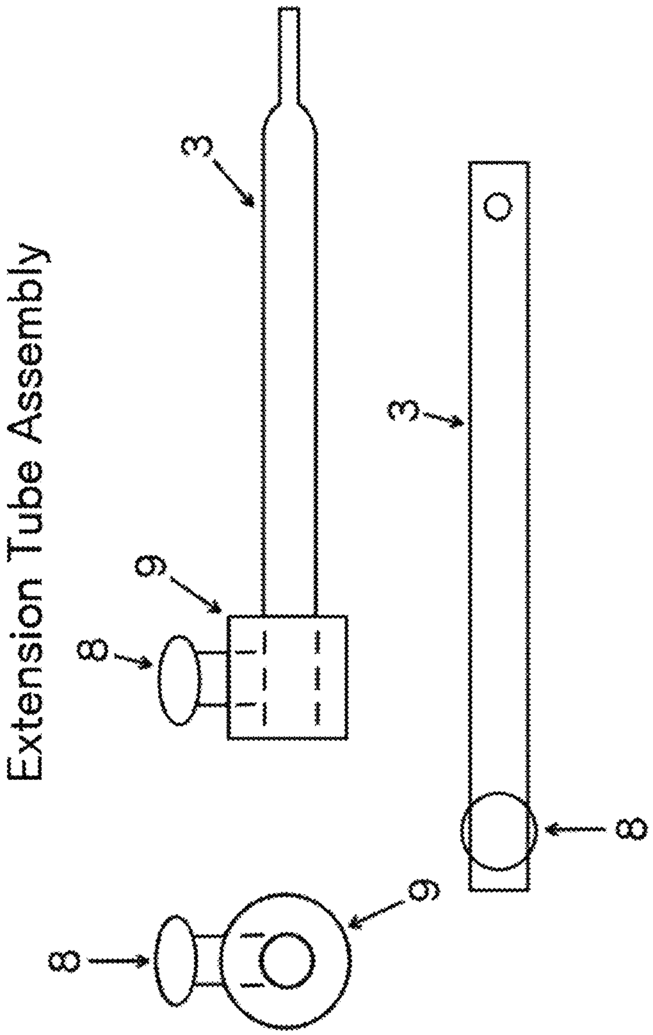
FIG. 8: are sectional views of the extender tube assembly.

There are four embodiments of the present invention that distinguish it from all prior art that has been documented herein: 1) the control arm 21 and its simplicity of use, for multiple positioning of a harmonica, for singing, playing or horizontal adjustment, 2) the sophisticated design and ease of use of extender tube assemblies FIG. 8, for vertical adjustment, 3) a simple pull down loop 7, to quickly remove a harmonica and 4) the adjustable neck support 14, for maximum comfort.

Figure 13:
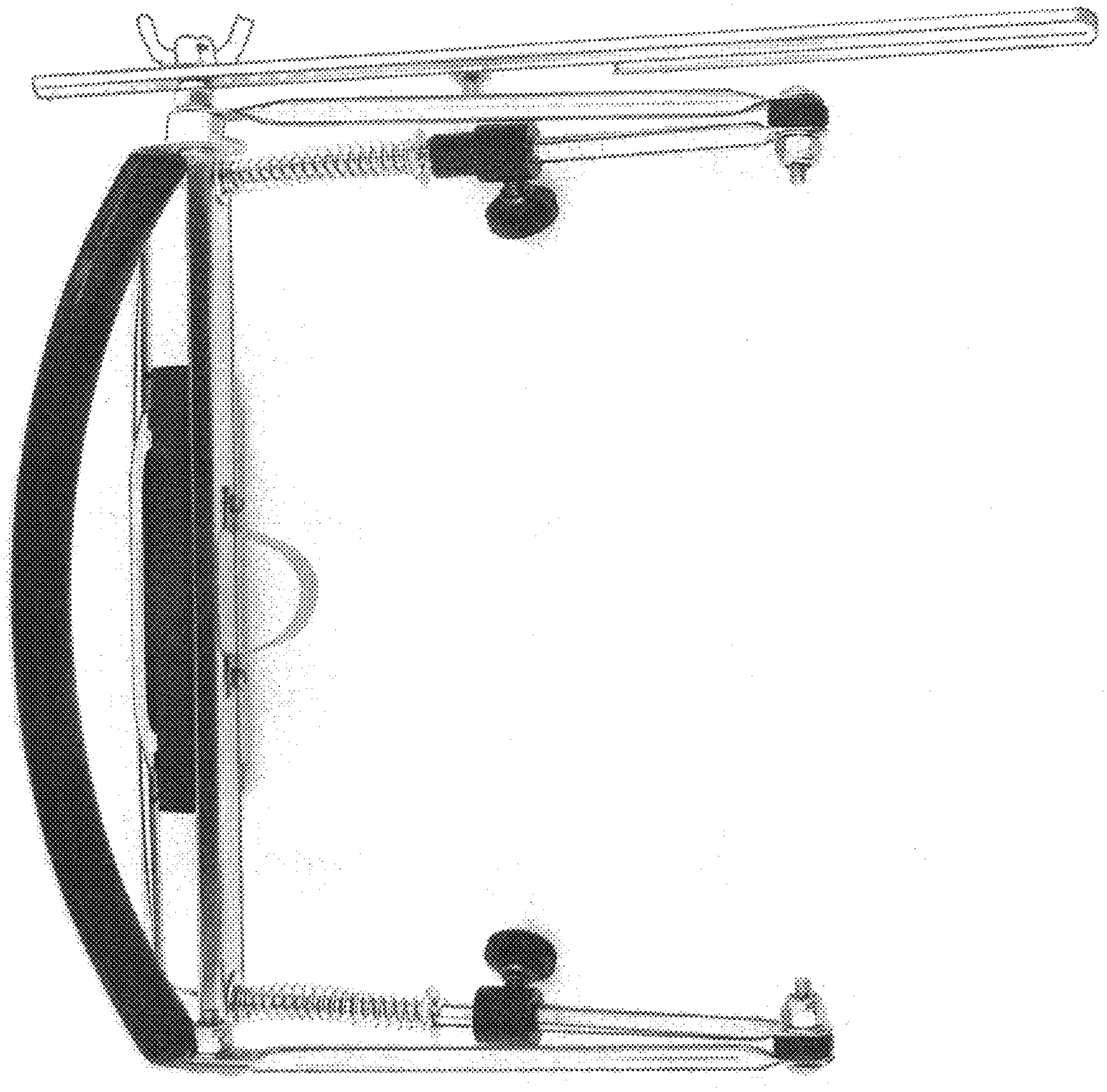
FIG. 13: Picture showing the present invention with the harmonica holder in the folded position, for storage or travel.
Figure 14:
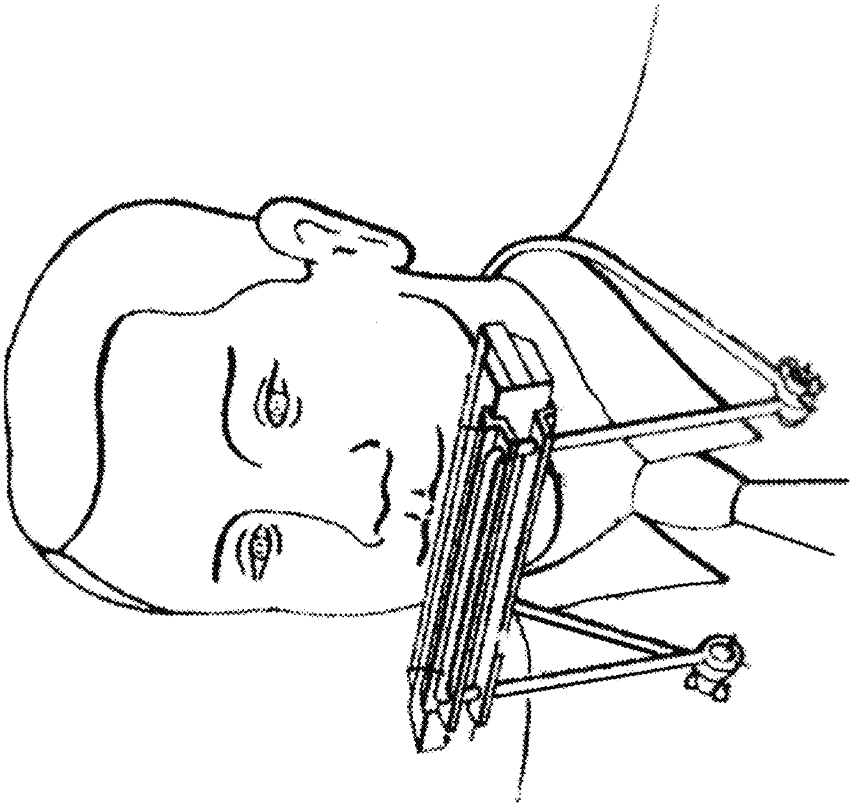
FIG. 14: Picture of an "over your head" prior art harmonica holder.
Figure 15:
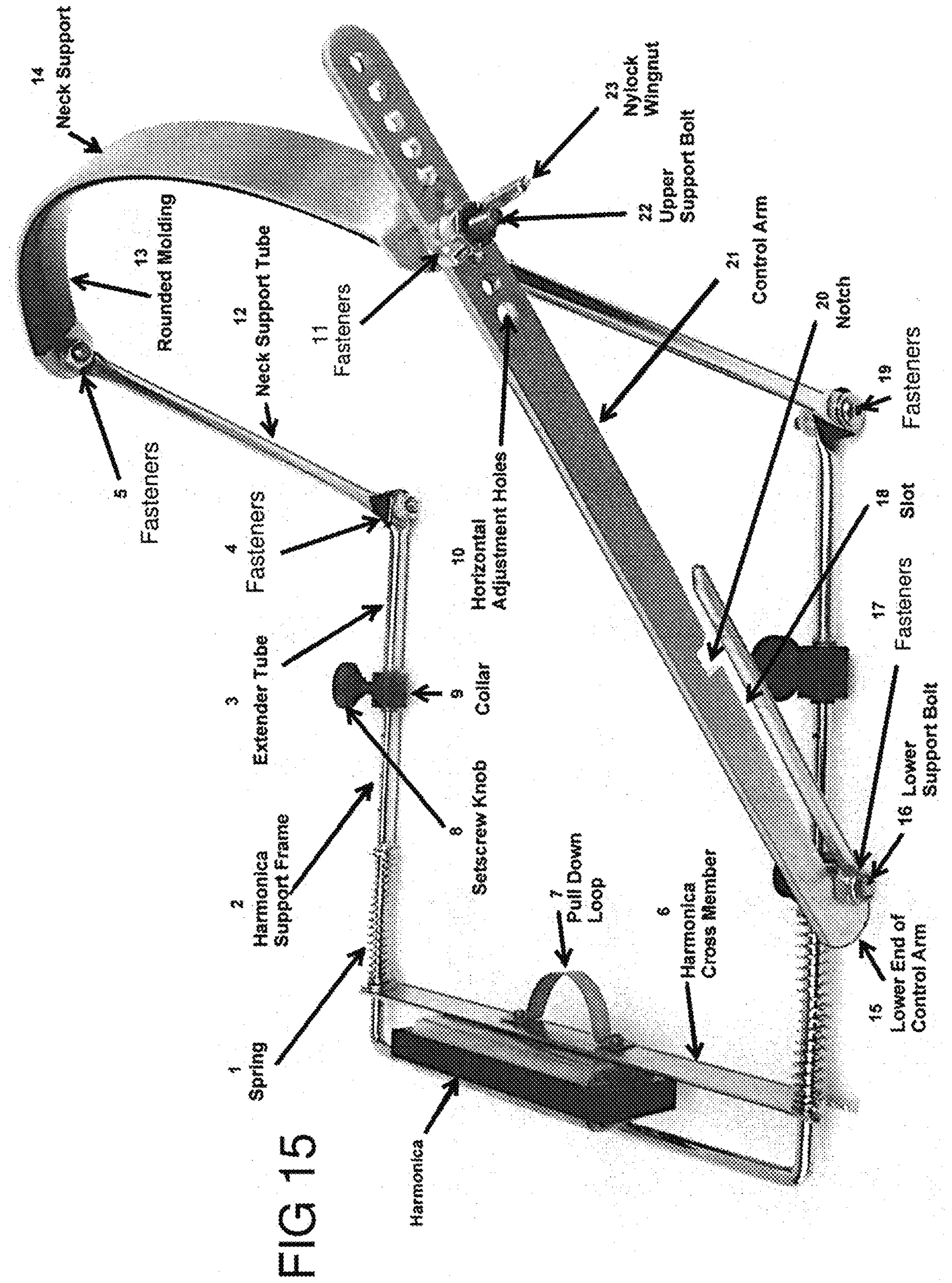
FIG. 15: Picture showing the names and part numbers related to the present invention, with the harmonica holder shown in the open position for singing or to remove a harmonica holder from a musician's head area.
Figure 16:
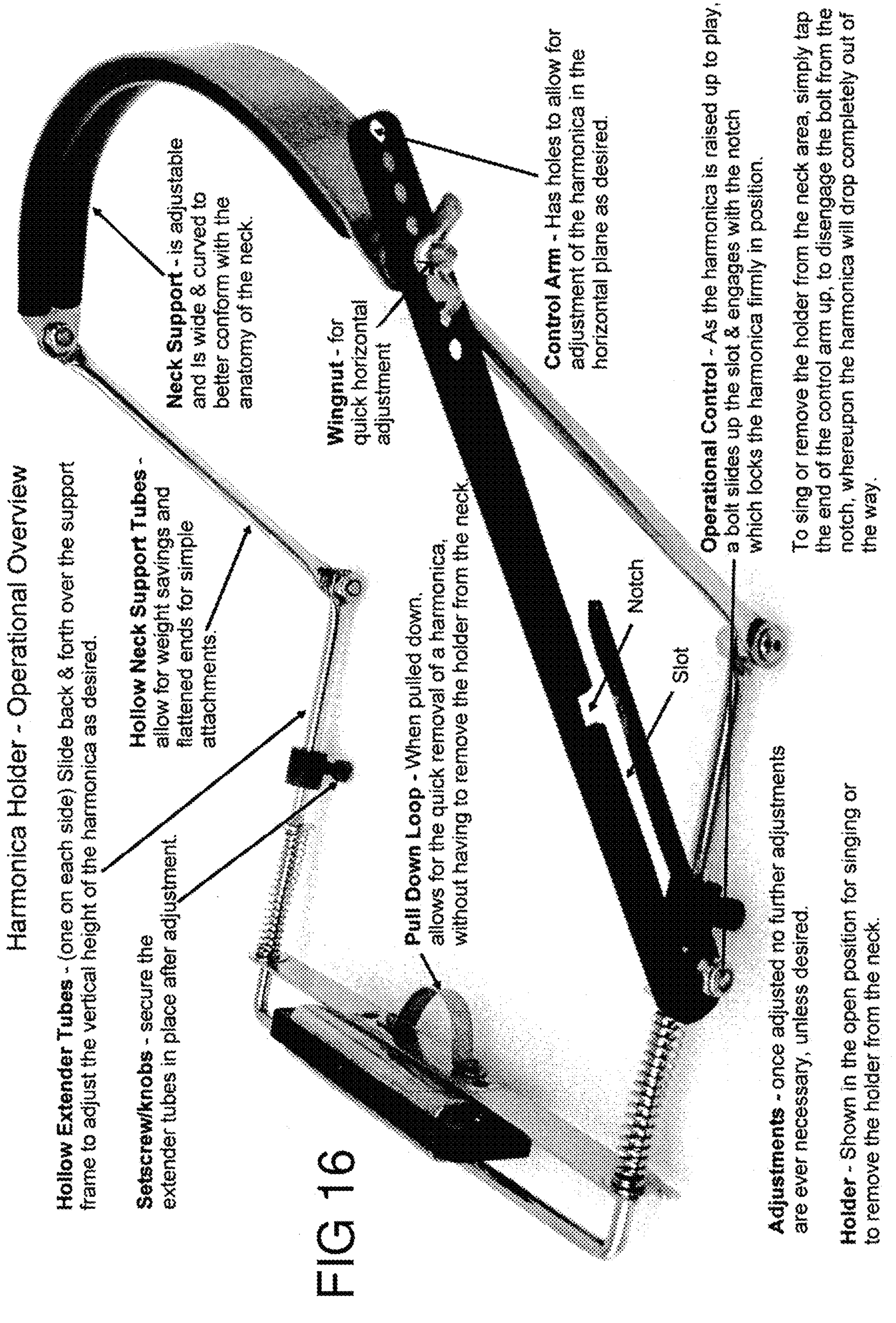
FIG. 16: Picture showing an operational overview of the present invention, with the harmonica holder shown in the open position for singing or to remove a harmonica holder from a musician's head area.

Harmonica Holder Overview: The harmonica holder is designed to be placed over the head of a musician and be supported by their neck and chest area, in order to play a harmonica without having to use their hands and is comprised of a harmonica support structure and a neck support structure, both of which are attached together at their lower ends, as a pivotal connection by fasteners 4 & 19 and spacers FIG. 11. The spacers FIG. 11 keep the neck support structure and the harmonica support structure from interfering with each other, when the harmonica holder is folded down FIG. 13, for storage or travel.

Harmonica Support Structure: The upper part of the harmonica support structure is comprised of a round rod harmonica support frame 2, wherein its cross section supports the upper side of a harmonica and its bent down sides support a harmonica cross member 6 which in turn supports the lower side of a harmonica. The harmonica cross member FIG. 6 has slots at each end to engage with the bent down sides of the harmonica support frame 2 and in turn the harmonica cross member 6 is supported at each end by springs 1, which puts pressure on the slotted ends of the harmonica cross member 6, to hold a harmonica in place. The harmonica cross member 6 and springs 1 are a necessary cooperative, whereas the harmonica cross member 6 has been modified to accommodate the pull down loop 7, which is attached to the underside of the harmonica cross member 6. Said modification involves drilling two countersunk holes into the harmonica cross member 6, from the top, to accept flathead pop rivets which are used to hold the pull down loop 7 in place. The pull down loop 7 is used to quickly remove a harmonica, by pulling down on the pull down loop 7, with one finger, and is designed with a tilt FIG. 4, to angle it back, to allow more room for a musician's lips. The harmonica support frame 2 is also a necessary cooperative, as it is used to allow hollow extender tube assemblies FIG. 8 to slid over the ends of the bent down sides of the harmonica support frame 2.

Figure 9:
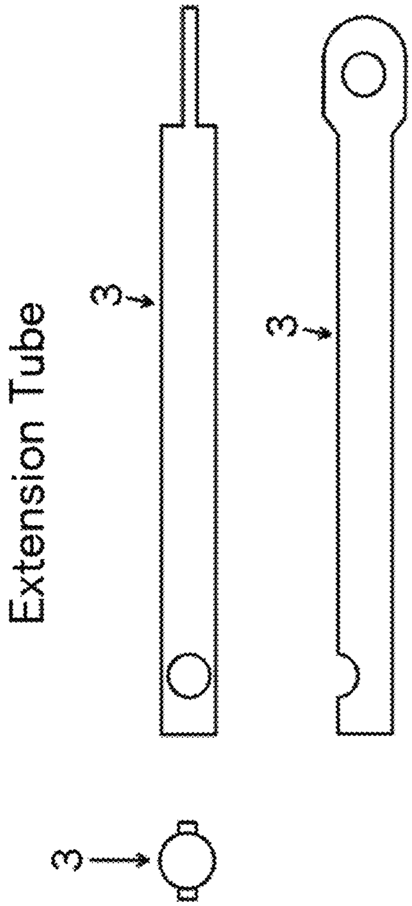
FIG. 9: are sectional views of the extender tube 3.

The lower part of the harmonica support structure is comprised of two extender tube assemblies FIG. 8 (one for each end of the harmonica support frame 2), each being comprised of an extender tube 3, a collar 9 and a setscrew/knob 8. Each collar has a hole drilled through its center FIG. 10, equal to the outside diameter of the extender tube 3 and a threaded hole in its top part, (perpendicular to the hole through its center), to except the setscrew/knob 8. With regards to the extender tubes 3, each has a hole drilled into its top part FIG. 9, equal to the inside diameter of the extender tube 3, whereupon the collars 9, are slipped over the open ends of each extender tubes 3, until the threaded hole in the collar FIG. 10, lines up with the hole in each extender tube FIG. 9. Before the collars 9 are mounted, glue is applied to the inside of each, to hold them in place. The setscrew/knob 8 is then screwed into each collar 9 after which the extender tube assemblies FIG. 8 are adjusted, (by being able to slide them back and forth), and the setscrew/knobs 8 are tightened up against the harmonica support frame 2, to secure the adjustment. The other ends of the extender tubes FIG. 9 are pressed flat and a hole drilled in each for attachment purposes to the neck support structure by fasteners 4 & 19, as a pivotal connection.

Neck Support Structure: The upper part of the neck support structure is comprised of a flat curved neck support 14 which has a rounded molding 13 attached to its underside. The ends of the neck support 14 are bent down to lineup with each neck support tube 12 and a hole drilled in each bent down end of the neck support 14, for attachment purposes to the neck support tubes 12, by fasteners 5 & 11. Whereas the neck support structure is a two piece unit, this allows the neck support 14 to be adjusted, at the connection between the neck support tubes 12 and the neck support 14, to better conform with the anatomy of a musician's neck area.

Figure 5:
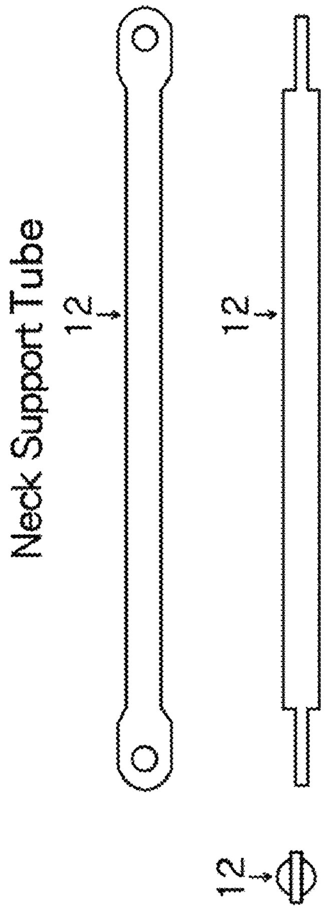
FIG. 5: are sectional views of the neck support tube 12.

The lower part of the neck support structure is comprised of two hollow neck support tubes 12, (one for each side of the neck support 14) wherein both ends of the neck support tubes FIG. 5 are pressed flat and a hole drilled in each end, for attachment purposes. The lower ends of the neck support tubes 12 are attached to the lower ends of the extender tube assemblies FIG. 8 (part of the harmonica support structure) by fasteners 4 & 19, as a pivotal connection.

The extender tube assemblies FIG. 8 could (as an alternative or in conjunction with) replace the neck support tubes 12, by attaching a rod to each side of the neck support 14 to facilitate adjustment of the extender tube assemblies.

Control Arm: The upper end of the control arm 21 is attached to the left side of the neck support structure (although it could be placed on the right side if desired), by an upper support bolt 22, that extends out beyond a nylock nut, (both of which are parts of the fasteners 11) that are holding the neck support tube 12 and the neck support 14 together. There are a plurality of horizontal adjustment holes 10 on the upper end of the control arm 21, to provide for alternate positions for the upper support bolt 22. After adjustment a nylock wingnut 23 is then screwed onto the upper support bolt 22, as a pivotal connection.

The lower end of the control arm 21 is supported by a lower support bolt 16, (part of fasteners 17) which is attached to the left side of the bent down harmonica support frame 2. Whereas the lower support bolt 16 extends out beyond a hex nut (part of the fasteners 17) this facilitates the control arm 21 to be positioned on the lower support bolt 16, whereupon a nylock nut (part of the fasteners 17) is then screwed onto the end of the lower support bolt 16, as a pivotal connection to prevent the control arm 21 from slipping sideways, but at the same time allowing the lower support bolt 16 to slid back and forth along a slot 18, wherein the slot 18 is cut into the underside of the control arm 21.

List of Part Materials: Without limiting the scope of other materials that could be used, the following represents the materials that are used.

All fasteners are stainless steel, although, among other possible materials, aluminum could be considered to save weight.

Figure 4:
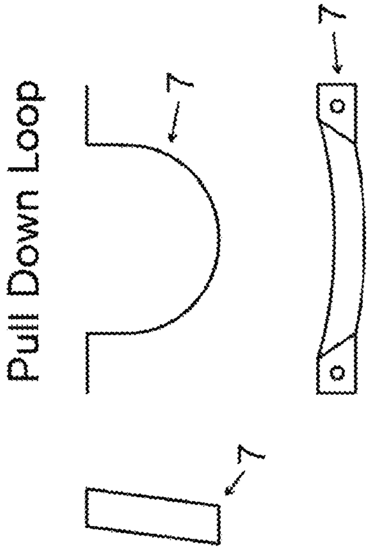
FIG. 4: are sectional views of the pull down loop 7.
Figure 6:
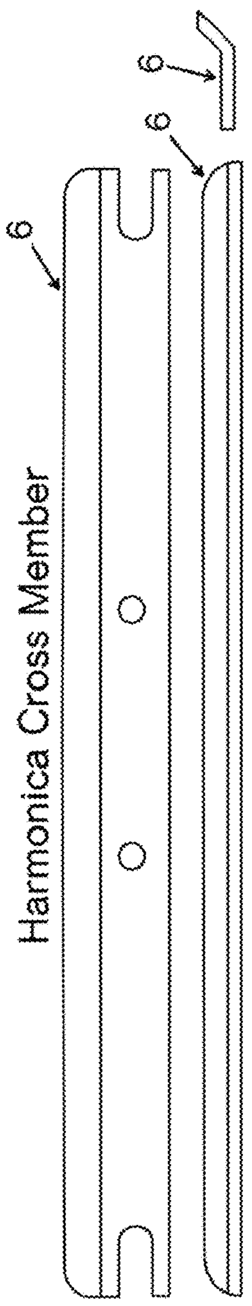
FIG. 6: are sectional views of the harmonica cross member 6.
Figure 7:
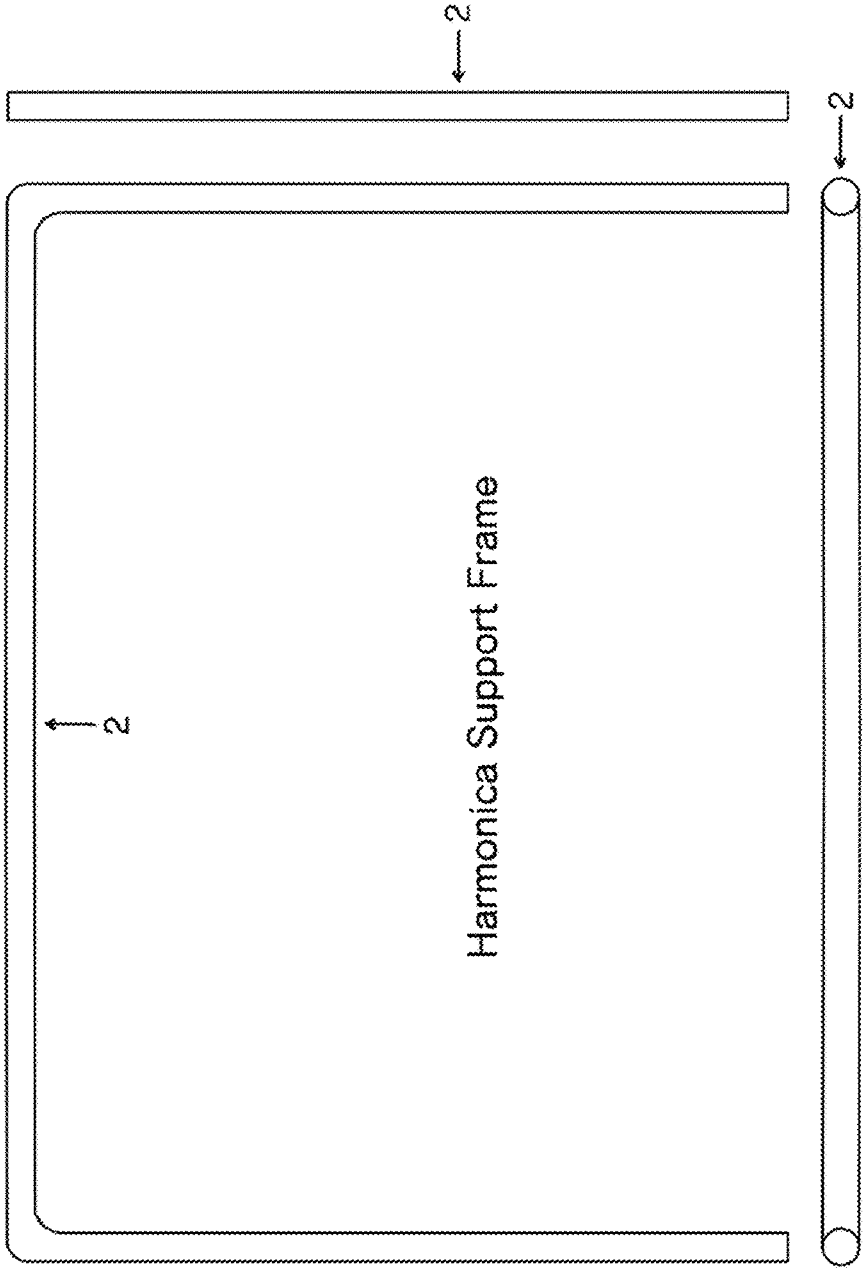
FIG. 7: are sectional views of the harmonica support frame 2.

The harmonica support frame FIG. 7, harmonica cross member FIG. 6 and pull down loop FIG. 4 are made of nickel, although, among other possible materials, chrome plated steel or aluminum (to save weight) could be considered.

The extender tubes FIG. 9 and neck support tubes FIG. 5 are stainless steel hollow tubes.

Figure 2:
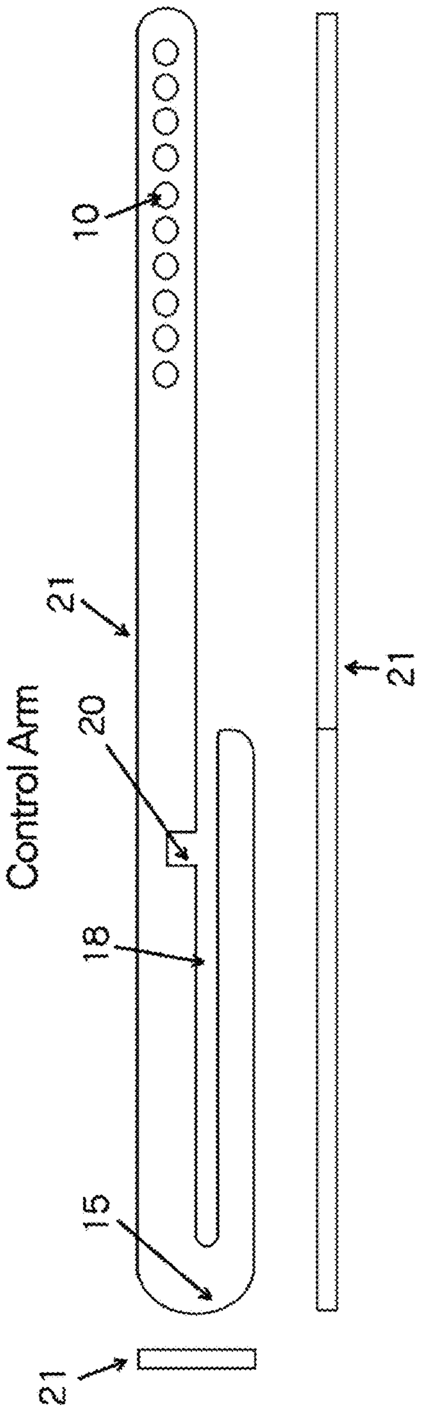
FIG. 2: are sectional views of the control arm 21.
Figure 3:
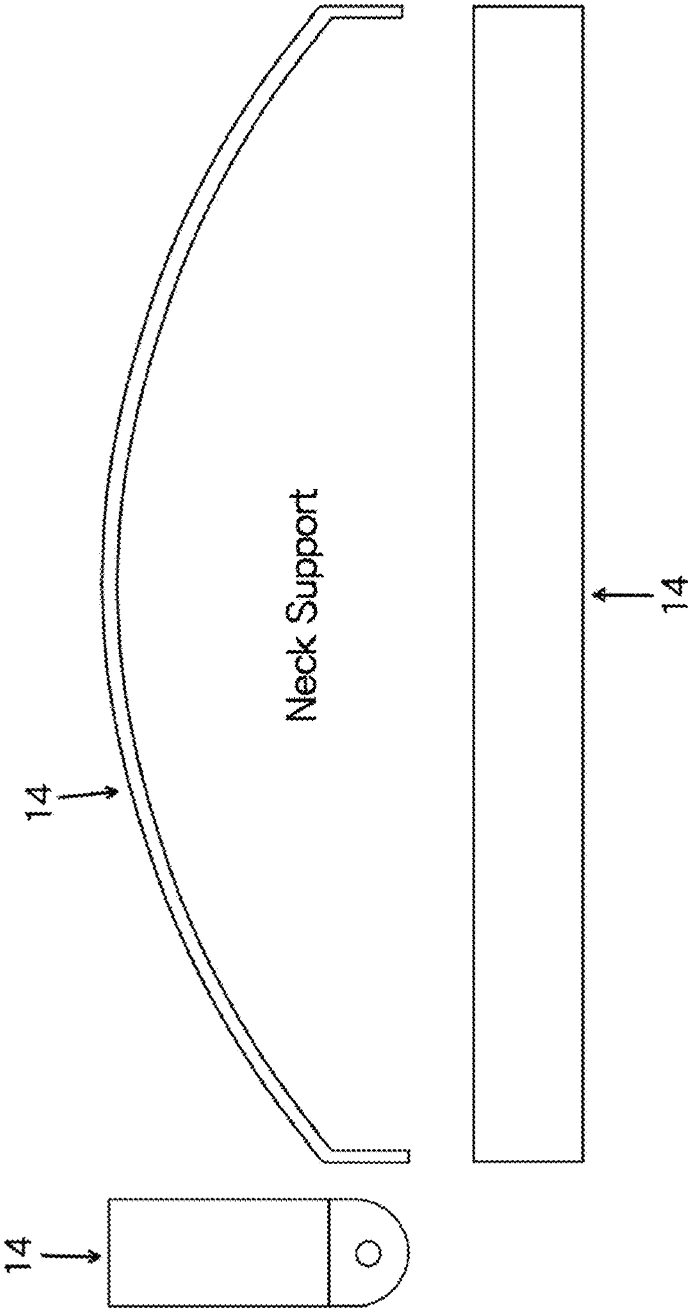
FIG. 3: are sectional views of the neck support 14.

The neck support FIG. 3 and control arm FIG. 2 are made of aluminum for saving weight, although, among other possible materials, chrome plated steel or nickel could be considered.

Figure 10:
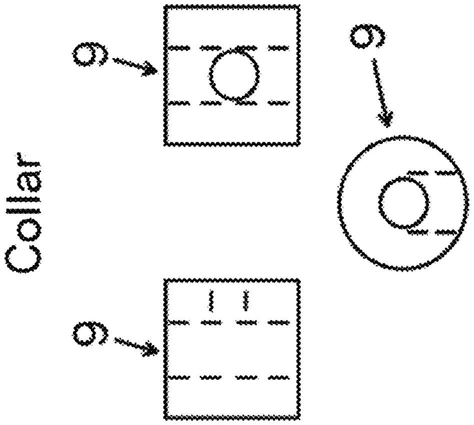
FIG. 10: are sectional views of the collar 9.

The collar FIG. 10 is made of aluminum, although, among other possible materials, chrome plated steel or nickel could be considered.

Figure 11:
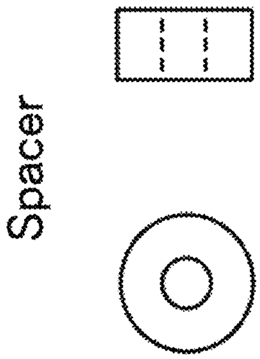
FIG. 11: are sectional views of the spacer.

The spacers FIG. 11 are made of a polymeric material, although, among other possible materials, aluminum could be considered.

The setscrew/knobs FIG. 8 consist of, a polymeric knob, holding a pressed in steel hex head setscrew, although, among other possible materials, these could be replaced by a one piece unit.

The rounded molding 13 is made of a flexible polymeric material.

Neck Support Adjustment: After a musician puts the harmonica holder over their head, they can adjust the angle of the neck support 14, if necessary, to ensure it lays flat against the back of their neck area. To do so they would 1) loosen the fasteners holding the neck support in place, 2) make the desired adjustments, and 3) retighten the fasteners.

Vertical Position Adjustment: Next a musician would adjust the vertical position of a harmonica, relative to their mouth area, to their personal preference. To do so they would loosen the setscrew/knobs 8, attached to the extender tube assemblies FIG. 8, and adjust the extender tube assemblies FIG. 8 evenly on both sides, by sliding the extender tube assemblies FIG. 8 to a desired position. After adjustment they would retighten both setscrew/knobs 8. The vertical plane refers to the height of a harmonica, relative to a musician's mouth area.

Horizontal Position Adjustment: A musician would then adjust the horizontal position of a harmonica to their personal preference by inserting the upper support bolt 22 into one of the preferred horizontal adjustment holes 10, on the upper part of the control arm 21, which will move a harmonica either closer to or further from a musician's mouth area. The horizontal plane refers to the distance between a harmonica and the area directly in front of a musician's mouth.

Harmonica Position Options: When doing the vertical and horizontal adjustments a musician has the option to adjust the position of a harmonica to the traditional "hands free position", by positioning a harmonica below their mouth, which means they would have to bend their head down to play it, but would not have to use their hands, when they would switch from playing a harmonica to singing. With the second option they can position a harmonica, level with their mouth and use one hand to drop a harmonica completely out of the away for singing. In either case a harmonica can be dropped away to remove the harmonica holder from their head area. Once a harmonica is adjusted it never has to be readjusted unless a musician wants to do so.

Figure 12:
FIG. 12: Picture showing the present invention with the harmonica holder in the closed position, for playing a harmonica.

Operational Details: With a harmonica adjusted to the personal preference of a musician, the musician would place the harmonica holder over their head while in the open position FIG. 1 and raise a harmonica up toward their mouth area to play. As it is raised up, the lower support bolt 16, slides up along the slot 18, until it engages in a notch 20, which locks a harmonica firmly in place (the closed position FIG. 12) for playing a harmonica. When a musician wants to drop a harmonica completely out of the way for singing, or to remove the harmonica holder from their head area, they would simply tap up on the lower end 15 of the control arm 21, which would disengage the lower support bolt 16 from the notch 20, whereupon the lower support bolt 16 would slide back down to the end of the slot 18, which would result in the harmonica holder being back in the open position FIG. 1. The slot 18 prevents the control arm 21 from disengaging from the lower support bolt 16, when the lower end 15 of the control arm 21 is tapped up, to release it from the notch 20. There is also the pull down loop 7, attached to the underside of the harmonica cross member 6, which allows a musician to place a finger in the pull down loop 7 and pull down, in order to quickly remove or change a harmonica from one key to another, without having to remove the harmonica holder from their head area to do so.

The embodiments of the present invention in which an exclusive property, privilege, scope and concept of the invention is claimed are defined as follows:

1. A control arm for a harmonica comprising a control arm: said arm connected to a neck support at a first end via an upper support bolt and a frame via a lower support bolt, said arm prevents said harmonica from moving out of position while being played; said arm further allows consistent adjustment of the harmonica in a horizontal plane; said arm is adjacent to a musician's mouth area; and once locked in place said arm maintains a position until said support bolts are adjusted; said arm are facilitates for repositioning of the harmonica, by the use of only one hand, for singing, playing the harmonica or removing said harmonica from a musician's head area.

2. The control arm according to claim 1: 1) has multiple adjustment holes, which allows for the adjustment of the harmonica in a horizontal plane 2) has a notch which holds the harmonica securely in place after adjustment and 3) has an elongated slot to prevent the control arm from disengaging from a lower support bolt, which is attached to a harmonica support frame, when releasing the harmonica from the notch, in order to sing or to remove the harmonica holder from the musician's head area.

3. The control arm according to claim 2: is adjusted by inserting an upper support bolt, which is attached to a neck support frame, into one of the multiple adjustment holes in the control arm, whereupon a nylock wingnut is screwed onto the upper support bolt, to secure the control arm as a pivotal connection.

4. The control arm according to claim 2: wherein the elongated slot of the control arm, controls the movement of the harmonica, wherein, as the harmonica is raised up to play, the lower support bolt slides up the elongated slot of the control arm, until said bolt engages in the notch, which holds the harmonica in place.

5. The control arm according to claim 4: allows for the disengagement of the harmonica from the notch, by tapping up on the control arm, whereupon the lower support bolt disengages from the notch and slides back down the elongated slot, resulting in the harmonica being completely out of the way for singing or to remove the harmonica holder from the musician's head area.

6. An extender tube assembly for a harmonica: said extender tube connected to a collar of a neck support structure and a control arm; said extender tube provides vertical adjustment of the harmonica via a setscrew knob; said extender tube positioned adjacent a user's mouth area; and wherein said extender tube is adjusted and locked in to maintain a position of said neck support structure.

7. The extender tube assembly according to claim 6: provides for the vertical adjustment of a harmonica wherein the said extender tube assembly is comprised of a hollow extender tube which slides over a smaller tube, with the said hollow extender tube being attached to a neck support frame and the said smaller tube being part of a harmonica support frame, with a collar slipped over the said hollow extender tube and a setscrew/knob screwed into the collar, to secure the said hollow extender tube to the said smaller tube after adjustment.

8. A pull down loop for a harmonica support devise comprising a support frame and a cross member, said cross member supported at each end by springs; said pull down loop attached to said cross member in order to facilitate removal of the harmonica from said support frame, without having to remove a harmonica apparatus from a musician's head area; said pulldown loop when pulled engages said spring; thereby releasing said harmonica from said support frame that holds the harmonica in place.

9. The pull down loop according to claim 8: is angled back from the cross member, so as not to interfere with the musician's mouth area while playing the harmonica.

* * * * *